(12) United States Patent
Wang et al.

(10) Patent No.: US 8,733,656 B2
(45) Date of Patent: May 27, 2014

(54) CODE AND PART ASSOCIATING METHOD AND APPARATUS

(75) Inventors: Lei Wang, Wayland, MA (US); Gang Liu, Natick, MA (US); David Li, West Roxbury, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 13/477,351

(22) Filed: May 22, 2012

(65) Prior Publication Data

US 2013/0313312 A1 Nov. 28, 2013

(51) Int. Cl.
*G06K 7/10* (2006.01)

(52) U.S. Cl.
USPC .......................................................... 235/454

(58) Field of Classification Search
USPC .............................. 235/385, 439, 454, 462.08
See application file for complete search history.

(56) References Cited

U.S. PATENT DOCUMENTS

| | | | |
|---|---|---|---|
| 5,335,777 A | 8/1994 | Murphy et al. | |
| 5,633,487 A | 5/1997 | Schmutz et al. | |
| 5,969,325 A * | 10/1999 | Hecht et al. | 235/462.16 |
| 6,347,740 B1 | 2/2002 | Bengala | |
| 6,629,369 B1 | 10/2003 | Korner et al. | |
| 6,629,639 B2 | 10/2003 | Bengala | |
| 6,896,185 B2 * | 5/2005 | Uhl et al. | 235/454 |
| 7,004,393 B2 * | 2/2006 | Schum et al. | 235/462.08 |
| 7,050,631 B2 * | 5/2006 | Bian et al. | 382/183 |
| 7,118,042 B2 * | 10/2006 | Moore et al. | 235/462.48 |
| 7,161,688 B1 | 1/2007 | Bonner et al. | |
| 7,357,327 B2 | 4/2008 | Odenthal | |
| 7,433,590 B2 | 10/2008 | Freyman | |
| 7,586,049 B2 | 9/2009 | Wurz | |
| 7,905,410 B2 | 3/2011 | Good et al. | |
| 8,383,977 B2 | 2/2013 | Culp et al. | |
| 2008/0035727 A1 * | 2/2008 | Stanzel et al. | 235/385 |
| 2009/0095600 A1 | 4/2009 | Reichenbach et al. | |
| 2009/0242643 A1 * | 10/2009 | Nakamura | 235/462.06 |
| 2011/0080476 A1 | 4/2011 | Dinauer et al. | |
| 2011/0248083 A1 | 10/2011 | Bonner et al. | |

FOREIGN PATENT DOCUMENTS

WO 02057030 A1 7/2002

OTHER PUBLICATIONS

Datalogic, AccuVision AV6010, Long-Range Camera System, 4 pages, circa 2011.
Datalogic, DS2400N, 2 pages, Rev. 04, May 2013.
SICK Sensor Intelligence, ICR880 Image-based Code Reader, web page: www.sick.com/group/EN/home/products/product_news/identification_system, 1 page Dec. 9, 2013.

* cited by examiner

*Primary Examiner* — Seung Lee
(74) *Attorney, Agent, or Firm* — Quarles & Brady LLP

(57) ABSTRACT

An apparatus for associating codes on parts with part spaces on a conveyor wherein each part has a leading edge and a trailing edge that define a part space and each part is to be marked with at least one code, the apparatus comprising an area scan camera having a two dimensional field of view (FOV), the camera supported adjacent the conveyor so that parts conveyed by the conveyor pass through the FOV, a processor linked to the area scan camera, the processor programmed to perform the steps of receiving images from the area scan camera, identifying the locations of codes on parts in at least one of the images wherein a code located is a located code, identifying the locations of leading and trailing edges of parts wherein the leading and trailing edges define part spaces and associating each located code with a part space that includes the location of the located code.

29 Claims, 10 Drawing Sheets

CODE AND PART ASSOCIATING METHOD AND APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to machine vision systems and more particularly to a system that uses an area scan camera to read identification codes on parts and to associate those codes with parts at specific locations on a conveyor.

Many different industries now use imaging systems to track locations of items (e.g., parts, packages, etc.) within a facility and more specifically on conveyors, transfer lines, etc. To track parts on a conveyor, bar or 2D matrix codes are applied to each part and a camera is provided adjacent the conveyor for sensing the code as the part passes through a field of view (FOV). In order to provide high resolution images with minimal hardware cost, most systems use a line camera to sense parts and codes. While line scan cameras work well in some applications, systems that use a line scan camera have several shortcomings.

First, line scan cameras are only capable of generating a single image of a part and associated code. In many cases when a single image is obtained, image quality of the single image may be insufficient for decoding purposes due to variations in code tilt angle within the FOV, jitter of the part or camera during image acquisition, imperfect lighting conditions, poor mark quality, etc., and therefore line scan cameras that only obtain a single image often have read rates which are unacceptable for some applications.

Second, while it may be relatively inexpensive to purchase a line scan camera, often times the process of properly setting up line scan systems to be accurately aligned relative to conveyor motion is time consuming and hence relatively expensive.

Other systems that include two dimensional area scan cameras have been configured that can read codes with much improved read rates due to the fact that area scan cameras are capable of obtaining multiple images of a code as the code passes through a FOV and therefore several decode attempts per code can be attempted using different images. While systems including area scan cameras have relatively high read rates, unfortunately known area scan systems cannot correctly associate decoded codes with precise conveyor locations.

BRIEF SUMMARY OF THE INVENTION

It has been recognized that a simple system may be provided for tracking part locations within a two dimensional field of view to be associated with decoded codes where the simple system includes a processor, a two dimensional camera, an encoder and a presence sensor. The encoder is linked to a conveyor and generates encoder signals indicating movement of the conveyor. The encoder count is incremented each time the conveyor moves an encoder incremental distance. The presence sensor generates leading and trailing edge signals each time a leading edge and a trailing edge of a part are sensed, respectively. The camera generates two dimensional images of a field of view through which the conveyor moves parts. When the sensor senses an edge, the processor assigns a current encoder count to the edge. Each image is associated with an encoder count that occurs when the image is obtained. The processor attempts to decode codes in each obtained image. When a code is decoded in an image, the processor uses the encoder count associated with the image, the encoder incremental distance and the leading and trailing edge pulse counts to identify the current locations of the leading and trailing edges in at least some embodiments. The current edge locations are compared to the location of the decoded code and if the code is within the space defined by the current edge locations, the code is associated with the part space defined by the edges for subsequent tracking.

In other embodiments, after a code is decoded, the location of the code when leading and trailing edges are detected may be calculated for comparison to the leading and trailing edge locations to facilitate a similar code and part association process. While some embodiments include a presence sensor, other embodiments do not and instead rely on analysis of obtained images to determine locations of part edges to be associated with codes.

While some embodiments only identify leading and trailing edge locations of parts, others are capable of identifying lateral or side edges of parts (e.g., via image analysis) to handle cases where the spaces of two parts along a conveyor movement trajectory overlap.

Consistent with the above comments, at least some embodiments include an apparatus for associating codes on parts with part spaces on a conveyor wherein each part has a leading edge and a trailing edge that define a part space and each part is to be marked with at least one code, the apparatus comprising an area scan camera having a two dimensional field of view (FOV), the camera supported adjacent the conveyor so that parts conveyed by the conveyor pass through the FOV, a processor linked to the area scan camera, the processor programmed to perform the steps of receiving images from the area scan camera, identifying the locations of codes on parts in at least one of the images wherein a code located is a located code, identifying the locations of leading and trailing edges of parts wherein the leading and trailing edges define part spaces and associating each located code with a part space that includes the location of the located code.

In some cases the step of identifying locations of codes includes identifying the locations of codes at a first time and wherein the step of identifying the locations of the leading and trailing edges includes identifying the locations of the leading and trailing edges at the first time. Some embodiments include an encoder associated with the conveyor for generating an encoder pulse count each time the conveyor moves an incremental encoder distance, the step of identifying the locations of the leading and trailing edges including the step of using the encoder pulse count to identify the locations of the leading and trailing edges of parts at the first time. In some cases the processor is further programmed to identify leading and trailing edge pulse counts for each part on the conveyor when the leading and trailing edges of the part are at a sensor location on the conveyor, respectively, and wherein the step of identifying the locations of leading and trailing edges of parts include the step of using the encoder pulse count, the encoder incremental distance, and the leading and trailing edge pulse counts to calculate the locations of the leading and trailing edge pulse counts at the first time.

Some embodiments also include a part presence sensor supported adjacent the conveyor at the sensor location for sensing presence of the leading and trailing edges of the parts and providing edge detection signals to the processor. In some cases the conveyor moves parts into the FOV along a conveyor trajectory and wherein the sensor location occurs prior to the location at which the code location is identified along the conveyor trajectory. In some cases the conveyor moves parts into the FOV along a conveyor trajectory so that parts enter the FOV along an entry edge and leave the FOV along an exit edge and wherein the part presence sensor is located proximate the entry edge.

In some cases the step of identifying the location of the leading edge at the first time includes the steps of calculating a leading edge difference count between the encoder pulse count at the first time and the leading edge pulse count, using the leading edge difference count and the encoder incremental distance to calculate a leading edge position change and combining the leading edge position change and the first location to identify the position of the leading edge at the first time and wherein the step of identifying the location of the trailing edge includes the steps of calculating a trailing edge difference count between the encoder pulse count at the first time and the trailing edge pulse count, using the trailing edge difference count and the encoder incremental distance to calculate a trailing edge position change and combining the trailing edge position change and the first location to identify the position of the trailing edge at the first time.

In some cases the step of identifying the locations of codes in at least one of the images at a first time includes obtaining a plurality of images, attempting to decode codes in at least a subset of the obtained images and, when a code is successfully decoded, identifying the location of the successfully decoded code. In some cases the processor identifies the leading and trailing edges of first and second parts prior to identifying the location of a code and wherein, after the processor identifies the location of a code, the processor associates the code with one of the first and second parts based on the code location and the part spaces associated with the first and second parts. In some cases the processor performs the step of identifying the locations of leading and trailing edges of parts by identifying the leading and trailing edges in the obtained images. In some cases the step of identifying the locations of leading and trailing edges of parts within the FOV at the first time includes identifying first and second lateral edges of the parts in the FOV to further define part spaces.

In some cases the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the location of the code at the first time to calculate the location of the of the code at the second time and associating when the location of the code at the second time is within the part space defined by the locations of the leading and trailing edges at the second time. In some cases the first time is after the second time. In some cases the second time is after the first time.

In some cases the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the locations of the leading and trailing edges at the second time to calculate the locations of the leading and trailing edges at the first time and associating when the location of the code at the first time is within the part space defined by the locations of the leading and trailing edges at the first time.

Other embodiments include an apparatus for associating codes on parts with part locations on a conveyor wherein each part has a leading edge and a trailing edge and each part is to be marked with at least one code, the apparatus comprising an encoder associated with the conveyor for generating an encoder pulse count wherein the conveyor moves a known encoder incremental distance along a conveyor trajectory each pulse count, a part presence sensor for detecting leading and trailing edges of parts at a first location on the conveyor, an area scan camera having a two dimensional field of view (FOV), the camera supported adjacent the conveyor so that parts conveyed by the conveyor pass through the FOV, a processor linked to the encoder, the sensor and the area scan camera, the processor programmed to perform the steps of, for each part that passes through the FOV, identifying a leading edge pulse count when the leading edge of the part is sensed by the presence sensor at the first location and identifying a trailing edge pulse count when the trailing edge of the part is sensed by the presence sensor at the first location, receiving images from the area scan camera, identifying the location of at least one code on a part in at least one of the images at a first time wherein the code located is a located code, for each of at least a subset of the parts in the FOV at the first time, using the leading edge pulse count and the trailing edge pulse count as well as the encoder pulse count and the known encoder incremental distance to identify a part space defined by the leading and trailing edges of the part at the first time and associating the located code with a part space including the location of the located code at the first time.

Still other embodiments include a method for associating codes on parts with part locations on a conveyor wherein each part has a leading edge and a trailing edge and each part is to be marked with at least one code, the method comprising the steps of providing a processor programmed to perform the steps of obtaining two dimensional images of a FOV that each includes a two dimensional space through which the conveyor moves parts along a conveyor trajectory, identifying the locations of codes on parts in at least one of the images wherein a code located is a located code, identifying the locations of leading and trailing edges of parts wherein the leading and trailing edges define part spaces and associating each located code with a part space that includes the location of the located code.

Some methods are also for use with an encoder associated with the conveyor for generating an encoder pulse count each time the conveyor moves an encoder incremental distance, the processor programmed to perform the step of identifying the locations of the leading and trailing edges by using the encoder pulse count to identify the locations of the leading and trailing edges of parts at the first time.

In some cases the processor is further programmed to identify leading and trailing edge pulse counts for each part on the conveyor when the leading and trailing edges of the part are at a sensor location on the conveyor, respectively, and wherein the step of identifying the locations of leading and trailing edges of parts include the step of using the encoder pulse count, the encoder incremental distance, and the leading and trailing edge pulse counts to calculate the locations of the leading and trailing edge pulse counts at the first time. In some cases the processor is programmed to perform the step of identifying the location of the leading edge at the first time by calculating a leading edge difference count between the encoder pulse count at the first time and the leading edge pulse count, using the leading edge difference count and the encoder incremental distance to calculate a leading edge position change and combining the leading edge position change and the first location to identify the position of the leading edge at the first time and to perform the step of identifying the location of the trailing edge by calculating a trailing edge difference count between the encoder pulse count at the first time and the trailing edge pulse count, using the trailing edge difference count and the encoder incremental distance to calculate a trailing edge position change and combining the trailing edge position change and the first location to identify the position of the trailing edge at the first time. In some cases the processor is further programmed to perform the step identifying the locations of codes in at least one of the images at a first time by obtaining a plurality of images, attempting to decode codes in at least a subset of the obtained images and, when a code is successfully decoded, identifying the location of the successfully decoded code.

In some cases the processor identifies the leading and trailing edges of first and second parts prior to identifying the location of a code and wherein, after the processor identifies the location of a code, the processor associates the code with one of the first and second parts based on the code location and the part spaces associated with the first and second parts. In some cases the processor performs the step of identifying the locations of leading and trailing edges of parts by identifying the leading and trailing edges in the obtained images. In some cases the step of identifying the locations of leading and trailing edges of parts within the FOV at the first time includes identifying first and second lateral edges of the parts in the FOV to further define part spaces.

In some cases the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the location of the code at the first time to calculate the location of the of the code at the second time and associating when the location of the code at the second time is within the part space defined by the locations of the leading and trailing edges at the second time. In some cases the first time is after the second time. In some cases the second time is after the first time.

In other cases the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the locations of the leading and trailing edges at the second time to calculate the locations of the leading and trailing edges at the first time and associating when the location of the code at the first time is within the part space defined by the locations of the leading and trailing edges at the first time. To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
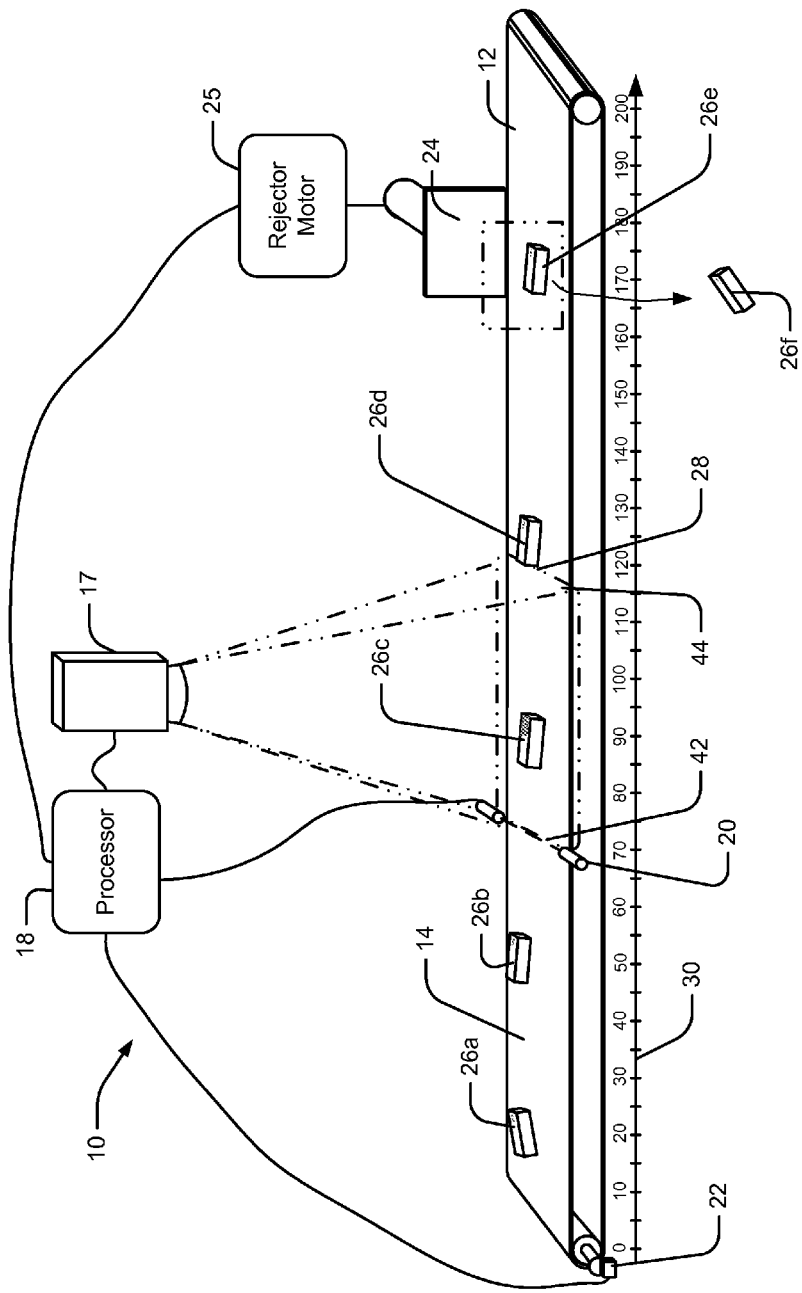
FIG. 1 is a schematic diagram illustrating a vision system used with a part conveyor that is consistent with at least some aspects of the present invention.

Referring now to the drawings wherein like reference numerals correspond to similar elements throughout the several views and, more specifically referring to FIG. 1, the present invention will be described in the context of an exemplary system 10 including a conveyor sub-assembly 12, a two-dimensional area scan camera 17, a system processor 18, a part presence sensor 20, a position encoder 22, a rejecter arm 24 and a rejecter motor 25. Conveyor assembly 12 is set up to convey parts along a conveyor trajectory path from left to right as illustrated in FIG. 1. Exemplary parts on a top surface 14 of the conveyor assembly 12 are labeled 26a, 26b, 26c, 26d and 26e and a part off assembly 12 is labeled 26f. In at least some embodiments the parts 26a-26f are singulated by a singulator sub-system (not illustrated) such that only one part is located at each location along the conveyor assembly at a time.

Referring still to FIG. 1, a location scale 30 is shown adjacent the length of conveyor assembly 12 indicating locations along the conveyor length. The exemplary scale range is between a zero position at a front end of the conveyor and a 200 position at a tail end of the conveyor. The units of length used to form scale 30 may be any units small enough to be useful in a particular application.

Referring again to FIG. 1, position encoder 22 is linked to conveyor assembly 12 and generates an encoder pulse count signal that can be used to identify the position of the conveyor belt along the conveyor trajectory and more specifically to identify the positions of parts located on top surface 14 of the conveyor assembly. To this end, encoder 22 increments an encoder pulse count each time top surface 14 of assembly 12 moves a set conveyor distance Dei (i.e., an "encoder incremental distance"). Thus, if the encoder pulse count is known when a part (e.g., 26a) is at a specific location on surface 14 along the conveyor trajectory, the change in encoder pulse count and encoder incremental distance Dei can be used to identify the instantaneous location of the part on surface 14 thereafter. This process of identifying the location of a part on surface 14 will be described in greater detail below. Encoder 22 provides the pulse count to processor 18.

Referring still to FIG. 1, camera 17 is an area scan camera and may include a two-dimensional CCD camera sensor, a two-dimensional CMOS camera sensor or any other type of camera sensor suitable for generating images for decoding purposes. Camera 17 has a field of view 28 which is focused by a lens on the 2D camera sensor. The camera sensor generates two-dimensional images of the field of view which are provided to processor 18. Camera 17 is supported adjacent conveyor assembly 12 so that as parts are moved along the conveyor trajectory (left to right as illustrated in FIG. 1) the parts move through the camera's field of view 28.

In at least some embodiments camera 17 is positioned such that the field of view 28 will cover an entire width of conveyor assembly 12 and a substantial area along the trajectory of conveyor movement so that more than one part may be located within field of view 28 at the same time (see FIG. 1). In FIG. 1, the camera field of view extends from an entry edge 42 at conveyor location 70 to an exit edge 44 at conveyor location 120. Exit edge 44 is downstream along the conveyor trajectory from entry edge 42. As the labels imply, as parts move into the field of view 28 via conveyor movement, the parts first enter field of view 28 along entry edge 42 and the parts then exit the field of view 28 along exit edge 44. The field of view entry edge location and field of view exit edge location are referred to hereafter as Len and Lex, respectively (see FIG. 2).

Figure 2:
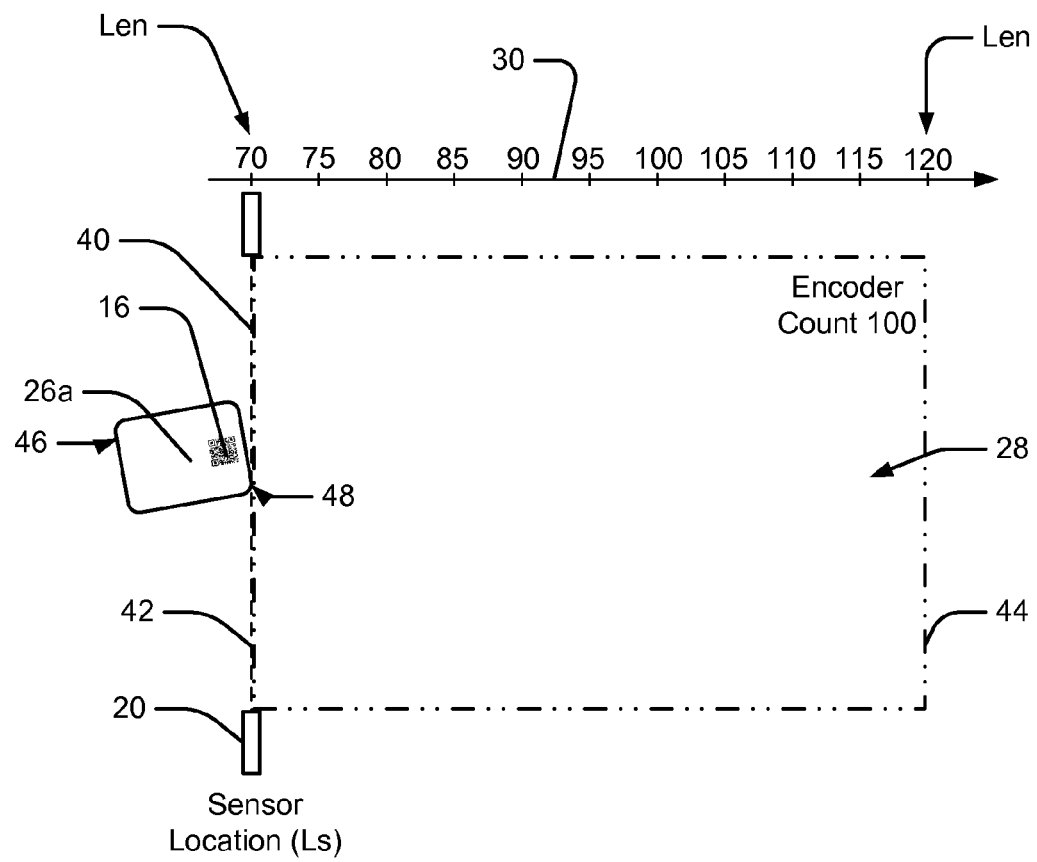
FIG. 2 is a schematic diagram showing a part moving into a field of view of a two-dimensional camera that forms part of the system shown in FIG. 1.

Referring again to FIG. 1, presence sensor 20 may take any of several different forms including a pencil-beam laser type sensor, a light sensor, etc. that can sense when a part interrupts a line across conveyor assembly 12. Referring also to FIG. 2, presence sensor 20 is supported adjacent top surface 14 along entry edge 42 of field of view 28 at a sensor or first location Ls for sensing when any portion of a part is located at a location associated with the entry edge 42. Sensor 20 provides a part present signal to processor 18 any time a part is present at the entry edge location 42.

Referring once again to FIG. 1, rejecter arm 24 and motor 25 are provided for removing parts from surface 14 under certain circumstances. For example, where a part must have an identification code applied to it the part does not have a code, processor 18 may cause motor 25 to activate arm 24 and push the part off surface 14 (see part 26f). Other criteria for removing a part from surface 14 are contemplated. In addition, other part handling or processing functions based on the code reading process are contemplated (e.g., directing different parts along different conveyor paths in a multipath system based on identifying information in a code).

Referring to FIG. 1, processor 18 is programmed to perform various processes, at least some of which are consistent with various aspects of the present invention. In general, processor 18 receives signals from encoder 22 and presence sensor 20 as well as images from camera 17 and uses the signals and the images to identify codes applied to parts moving through the field of view and, when a code is identified, to associate the code with a specific part space (e.g., location of a part) on conveyor surface 14. In the present example, where a part is sensed but no code is associated therewith, processor 18 controls motor 25 and arm 24 to remove the part from surface 14 once the part is located adjacent arm 24).

In at least some embodiments it is contemplated that during a commissioning procedure, the position of camera 17 and more specifically of field of view 28 with respect conveyor assembly 12 may be identified and provided to processor 18. The location of the field of view is specified by supplying entry and exit edge locations Len and Lex (see again FIG. 2), respectively. In addition, during the commissioning procedure the encoder incremental distance Dei (i.e., the distance that any point on conveyor surface 14 travels between encoder count increments) is identified and provided to processor 18. In the examples described herein, it will be assumed that the field of view location is between positions 70 and 120 as shown in the figures (see specifically FIG. 1) and that the encoder incremental distance is 0.20 units per count (i.e., a part moves one unit on the conveyor scale every five encoder counts).

Next, with a part on surface 14, the locations of leading and trailing edges of the part on the conveyor surface 14 may be identified once along with encoder pulse counts where the locations and encoder counts are subsequently used along with the changing encoder value to continually or periodically calculate instantaneous part locations with respect to conveyor assembly 12. Here, once an identification or other type of code in an obtained image is decoded successfully, the location of the code in field of view 28 may be determined and converted to a location with respect to conveyor assembly 12, the locations of all parts may be calculated using the instantaneous encoder pulse count, the leading and trailing edge pulse counts for each part, and the encoder incremental distance Dei. The locations of all parts on the conveyor can be compared to the location of the decoded code. Where the location of a decoded code corresponds to the location of one of the parts, the code is associated with the part location and tracking of the specific part commences. If a part exits field of view 28 without being associated with at least one code, processor 18 continues to track the location of the part and causes arm 24 to remove the part from conveyor assembly 12 once the part is adjacent arm 24.

Figure 6:
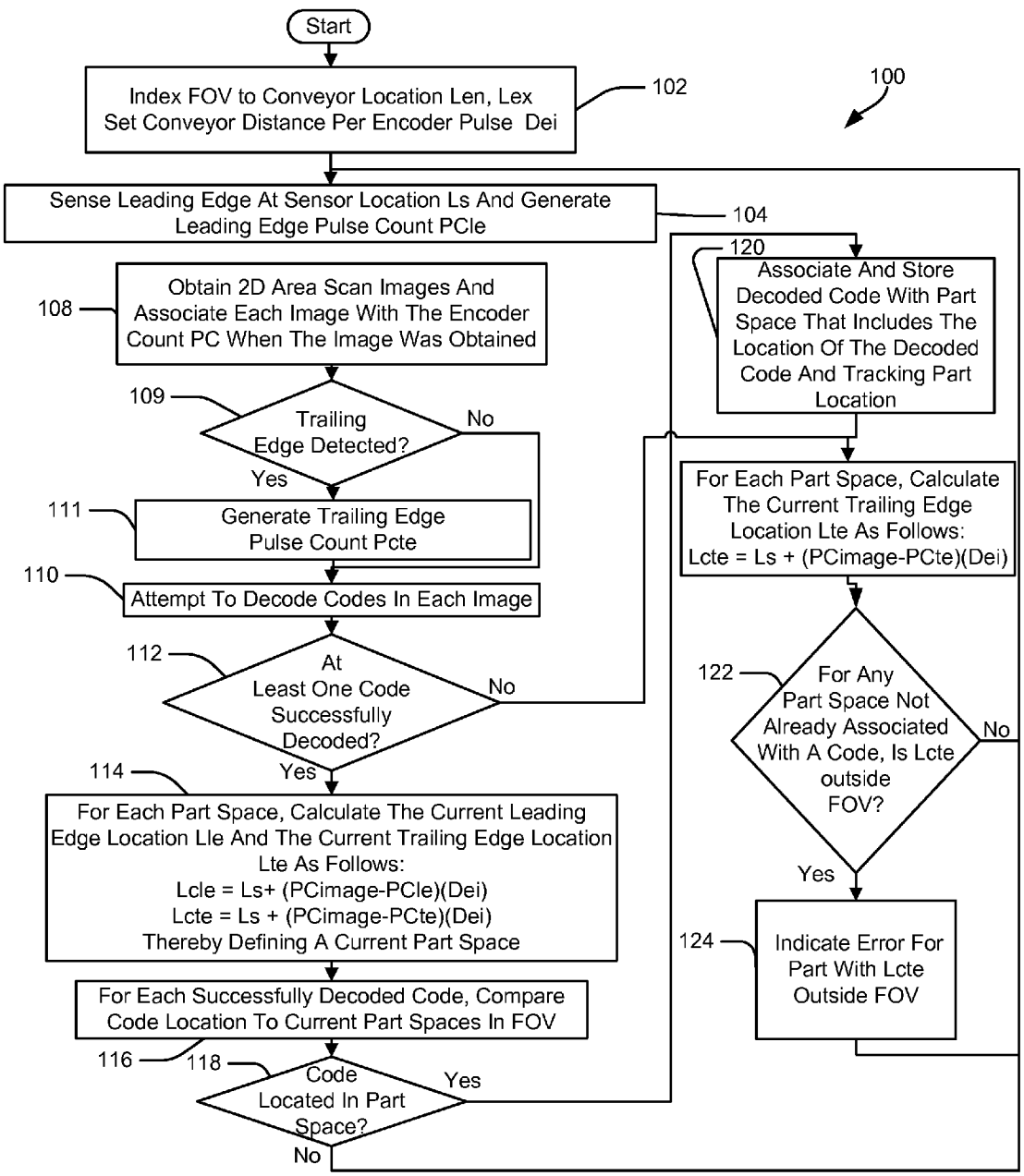
FIG. 6 is a flow chart illustrating a method that is consistent with at least some aspects of the present invention.

Consistent with the description above, referring to FIG. 6, a method 100 that is performed using the system 10 of FIG. 1 is illustrated that is consistent with at least some aspects of the present invention. At block 102, field of view 28 is indexed to the conveyor location by providing entry edge 42 and exit edge 44 locations (i.e., Len and Lex) to processor 18. In the present example, the entry and exit edge locations 70 and 120 are provided, respectively. Also, at 102, the encoder incremental distance Dei is provided to processor 18. Again, here it will be assumed that distance Dei is 0.20 units per encoder count.

Referring also to FIG. 2, a top plan view showing camera field of view 28 is illustrated where a part 26a which is moving from left to right is just on entry edge 42 of field of view 28 (see leading edge 48 of part 26a at entry edge 42). Once leading edge 48 breaks the line defined by entry edge 42, presence sensor 20 at location Ls generates a part present signal which is provided to processor 18 at block 104. When processor 18 receives the part present signal from sensor 20, processor 18 stores a leading edge pulse count PCle at block 104 corresponding to the instantaneous count generated by encoder 22. In this example it will be assumed that the leading edge pulse count is 100. When processor 18 received the part present signal, processor 18 also causes camera 17 to start obtaining images of field of view 28 at block 108. In at least some embodiments, camera 17 continues to obtain images of field of view 28 in rapid succession until no part is present within field of view 28. In other embodiments, once every part within field of view 28 has been associated with at least one code, processor 18 controls camera 17 to stop obtaining new images until a new part is sensed entering field of view 28.

Figure 3:
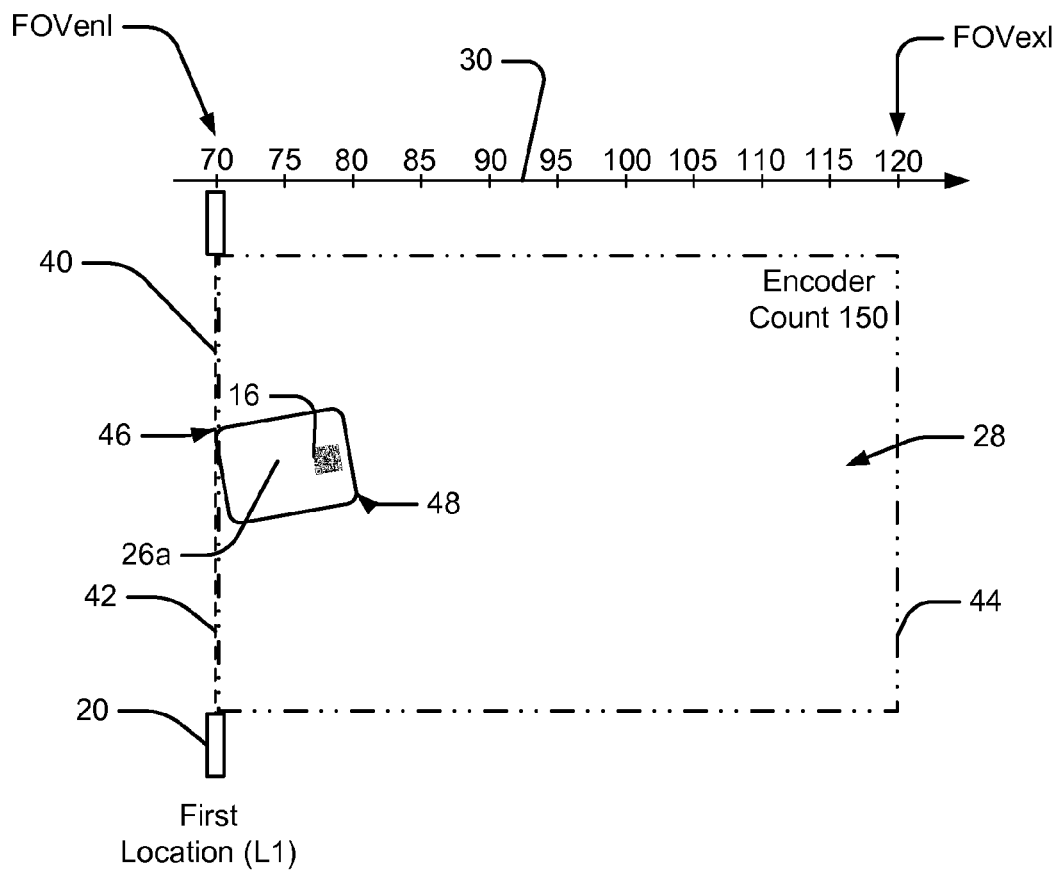
FIG. 3 is a similar to FIG. 2, albeit showing a different point in time when a part has moved further into the camera field of view.

Referring still to FIGS. 1 and 6 and now also to FIG. 3, as a part 26*a* moves into field of view 28, eventually the trailing edge 46 of the part 26*a* is sensed at block 109 when sensor 20 stops generating a part present signal. When trailing edge 46 is sensed, processor 18 records a trailing edge pulse count PCte at 111 thereby generating a pulse count pair (i.e., PCle and PCte) that define a part space for the most recent part to enter field of view 28. In this example, it is assumed that the trailing edge pulse count PCte is 150. After block 111 control passes to block 110. At block 109, if the trailing edge is not detected, control passes to block 110.

Once processor 18 receives an image from camera 17, processor analyzes the image at block 110 to identify code candidates where each code candidate includes a portion of the image that has at least some characteristics that are consistent with the portion being a code on a part. Once a code candidate is identified, processor 18 tries to decode the code. If a candidate is not successfully decoded at block 112, processor 18 discards the candidate and control passes to block 121. At block 121, for each part space (i.e., for each PCle, PCte pair), processor 18 calculates a current trailing edge location by solving the following equation:

$$Lcte = Ls + (PCimage - PCte)(Dei) \quad (1)$$

where PCimage is the instantaneous pulse count corresponding to the most recent image, Ls is the location of sensor 20 (see FIG. 2). PCte is the trailing edge pulse count for the part that work surface set at block 111, and Dei is the encoder incremental distance.

Next, processor 18 determines if any part previously sensed in field of view 28 has exited the field of view without having been associated with a decoded code. To this end, at block 122, processor 18 compares the trailing edge location Lcte of a part that is not associated with a code to the field of view exit edge location Lex. Where a current trailing edge location Lcte is beyond exit edge location Lex, processor 18 indicates an error signal for the part space associated with the trailing edge location Lcte (i.e., for the part that just exited field of view 28). The error signal is used to control rejecter motor 25 to remove the part from conveyor assembly 12 once the part is located adjacent arm 24.

Figure 4:
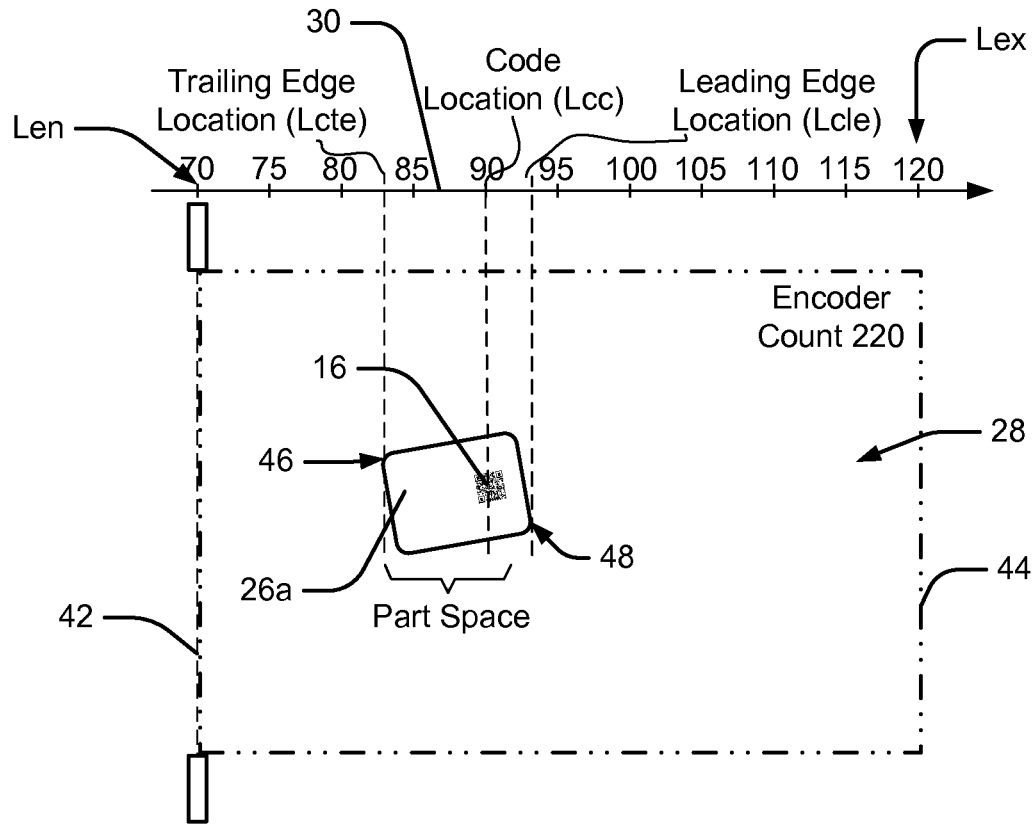
FIG. 4 is similar to FIG. 2, albeit showing a different point in time when the part has moved further into the camera's field of view.

Referring now to FIG. 4, as the part 26*a* moves along the conveyor trajectory within field of view 28, camera 17 generates a series of images which are provided to processor 18 for identifying code candidates and attempting to decode those candidates. Eventually, an image of a part including a code is obtained where the image of the code is of sufficient quality for processor 18 to decode the code at block 112. In the present example, it is assumed that processor 18 is able to decode code 16 in the FIG. 4 image when the code 16 is at conveyor location 90 and when the encoder count is 220. When a code is decoded, processor 18 stores an image pulse count PCimage indicating the encoder count for the image including the decoded code.

In FIG. 6, once a code is successfully decoded at 112, control passes to block 114 where processor 18 calculates a current leading edge location Lcle and a current trailing edge location Lcte for each part space within field of view 28 by solving equation 1 above for Lcte and solving the following equation for Lcle:

$$Lcle = Ls + (PCimage - PCle)(Dei) \quad (2)$$

where PCle is the leading edge pulse count for a part space.

In addition, once a code is successfully decoded in an image, the current location of the code Lcc in the image is calculated and converted to a location on the conveyor assembly 12. In this regard, the conversion from image location to conveyor location is a simple task given the location of field of view 28 on the conveyor assembly scale and the location of the code in the image. In the example, the calculated current code location Lcc is 90 (see again FIG. 4).

Continuing, at block 116, processor 18 compares the current code location Lcc to current part spaces (i.e., the spaces calculated at block 114 and currently associated with specific parts on assembly 12). At block 118, if the code is not located in a part space, control passes back up to block 104 where the process continues as described above. At block 118, if the code is located in a part space, control passes to block 120 where the decoded code is associated with the part space that included the location of the decoded code, the associated code and space are stored and part location tracking starts for down stream handling or other part related activities. After block 120, control passes to block 121.

In the present example, as indicated above, the current code location Lcc in FIG. 4 when code 16 is successfully decoded is 90, Ls (i.e., the location of sensor 20) is 70, the leading edge pulse count PCle was 100 (see FIG. 2) the trailing edge pulse count PCte was 150 (see FIG. 3), the encoder incremental distance Dei is 0.20 units of distance per count and the instantaneous pulse count PC is 220 (see FIG. 4). Thus, solving equations 1 and 2 above, the instantaneous or current leading edge location is 94 and the current trailing edge location is 84 for part 26*a*. Code location Lcc at 90 is included within the part space defined by locations 84 and 94 and hence part 26*a* is associated with code 16.

Figure 5:
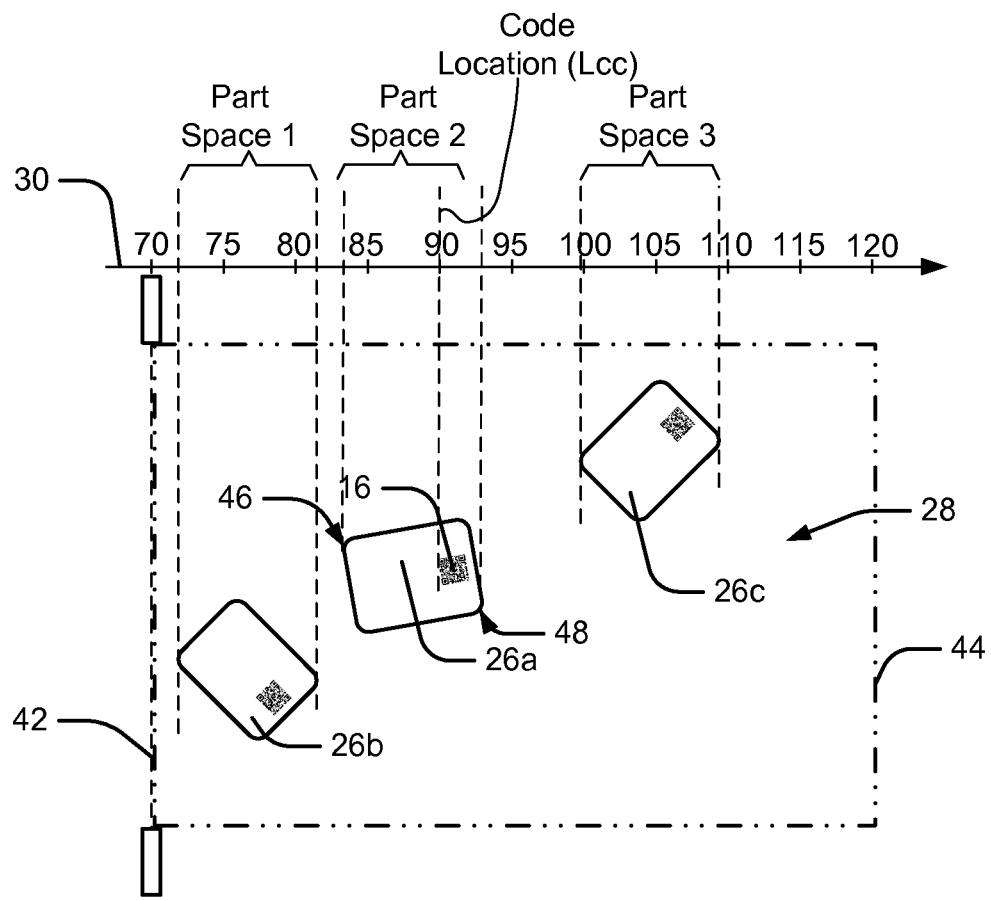
FIG. 5 is similar to FIG. 2, albeit showing three parts within a camera's field of view.

When there are multiple parts within field of view 28 at the same time, the FIG. 6 process is essentially as described above where edge calculations, location comparisons and associations are performed for each part space tracked in field of view 28. So, for example, referring to FIG. 5 where three parts 26*a*, 26*b* and 26*c* are located in field of view 28 at the same time, three separate part spaces as labeled would be calculated for comparison to decoded code locations and to the field of view exit edge location Lex and proper code and part associations would be made accordingly.

In at least some cases, referring again to block 112 in FIG. 6, two or more codes may be decoded in the same image. In this case, the locations of each decoded code are compared to part spaces in field of view 28 to associate each code with a separate one of the spaces. Where only one code is to be associated with each part, if two codes are associated with the same space, processor 18 may generate an error signal for downstream use.

Figure 7:
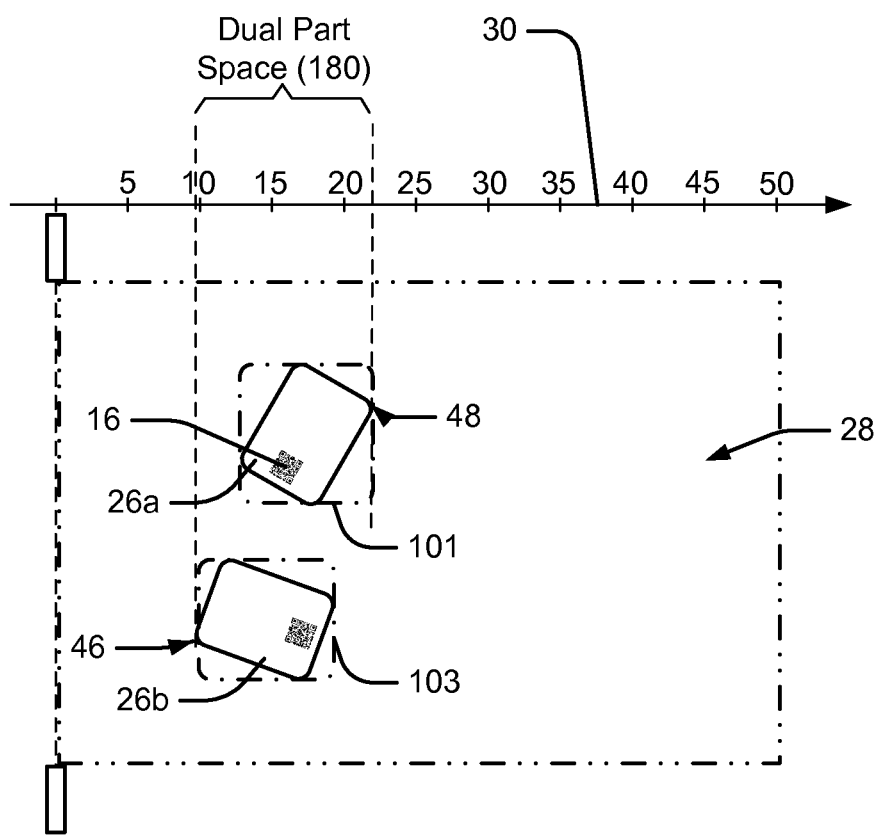
FIG. 7 is a is similar to FIG. 2, albeit showing two parts within a camera's field of view where the positions of the two parts overlap along a direction perpendicular to the direction of conveyor movement.

In some embodiments the system 10 may not include a singulator so that part spaces for more than one part may overlap at the same location along the direction of conveyor movement (see FIG. 7). In this case, it may be that when edges are detected using sensor 20, the leading edge of a first part 26*a* is sensed and the trailing edge 46 of a second part 26*b* is sensed but the trailing and leading edges of the first and second parts would not be sensed, respectively. Thus, the sensed edges would comprise a dual part space as shown in FIG. 7. Here, in at least some cases it is contemplated that, instead of using a sensor 20 to detect edges, processor 18 may be programmed to detect part edges by examining obtained images. More specifically, processor 18 may be programmed to sense not only leading and trailing part edges, but also to sense lateral or side edges so that two dimensional part spaces can be defined.

Figure 8:
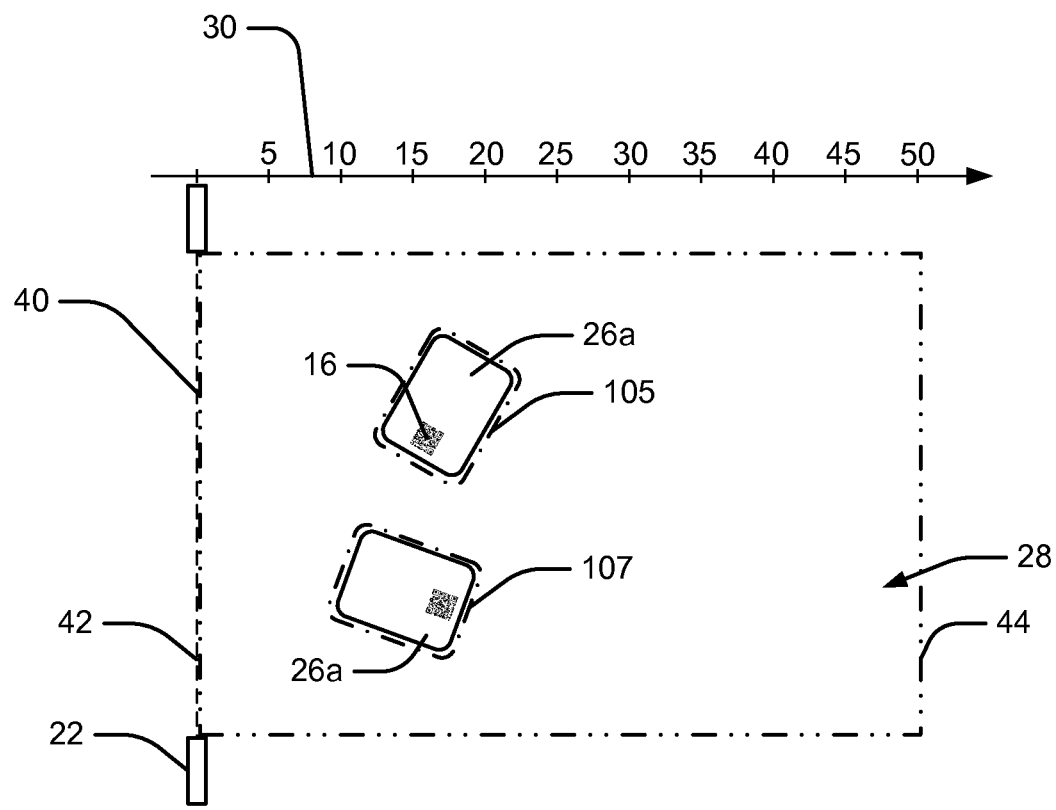
FIG. 8 is a is similar to FIG. 7, albeit showing move defined parts spaces associated with two parts on a conveyor.

In at least some cases the two dimensional part spaces 101 and 103 may be simple rectangular area boxes (see FIG. 7) aligned along the conveyors travel direction. In other cases the two dimensional part spaces 105, 107 may outline or circumscribe part edges more closely as in FIG. 8. In this case, processor 18 may be programmed to search for part spaces in each obtained image and, when a 2D part space is identified, may use an encoder signal to track the part space location thereafter as described above to cut down on computing overhead (i.e., the location of any part space need only be identified once). Thus, for instance, if part spaces 105 and 107 were first identified in the locations illustrated in FIG. 8, processor 18 could use pulse counts thereafter to track part locations within field of view 28 and thereafter and could associate decoded codes with part spaces as described above. One advantage here would be that the system would obtain and analyze a large number of images to locate edges increasing the find rate appreciably while still minimizing computing overhead.

In other cases the 2D part spaces may only be identified in an image after the location of a successfully decoded code has been identified. Here, one negative could be that by the time a code is successfully decoded, the number of images that can be examined to identify edges may be small and thus the edge find rate may be reduced.

In yet one other embodiment, a hybrid between the embodiment that uses a presence sensor to identify leading and trailing edges (see FIG. 1) and the embodiment that locates by performing image analysis is contemplated. In this embodiment, referring again to FIG. 1, a part presence sensor 20 is provided which generates and provides a part present signal to processor 18 that is used to assign a leading edge part count PCle and a trailing edge part count PCte to spaces corresponding to each sensed part. As in the first embodiment described above, once a leading edge is detected, images of field of view 28 are obtained until either all part spaces have moved out of field of view 28 or until decoded codes have been associated with each part space in field of view 28. In some embodiments processor 18 may be programmed to examine the obtained images to identify side part edges (e.g., edges that are neither leading nor trailing) by examining only portions of obtained images between leading and trailing edges to minimize computing overhead. In other embodiments, processor 18 may only search for side edges between leading and trailing edges after a successful code decoding where the decoded code is located within a space defined by the locations of a leading edge and a trailing edge pair associated with a part space.

Figure 9:
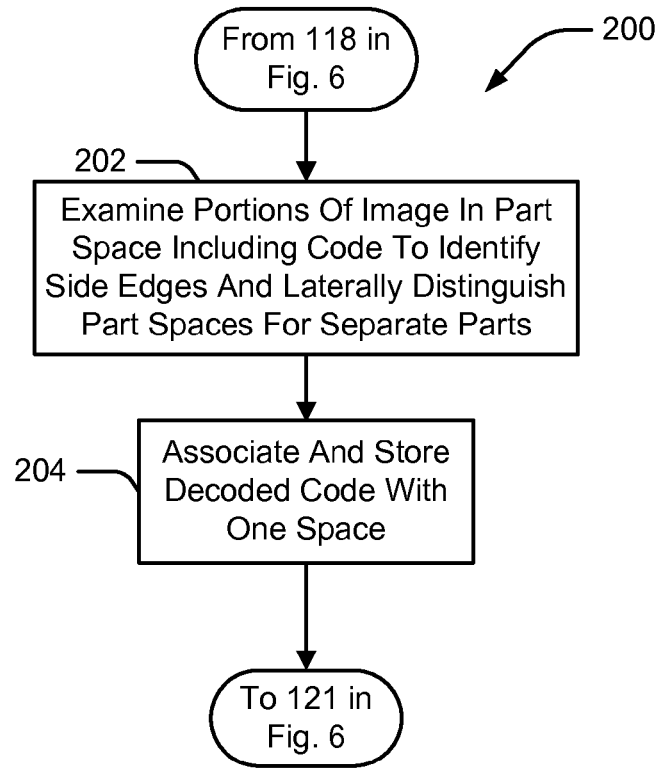
FIG. 9 is a subprocess that may be substituted for a portion of the process shown in FIG. 6 for dealing with parts that overlap in space as shown in FIGS. 7 and 8.

Referring now to FIG. 9, a sub-process 200 that may be substituted for a portion of the process shown in FIG. 6 is illustrated where side edges are located only after a code located between a leading edge and a trailing edge pair has been decoded. Referring also to FIGS. 1 and 6, after a decoded code has been located within a part space at decision block 118, processor 18 control may pass to block 202 in FIG. 9 where processor 18 examines the portion of the image that includes the decoded code and that corresponds to the part space associated with the decoded code to identify side edges of parts within the part space. Thus, for instance, in FIG. 7 after code 16 has been decoded and associated with leading and trailing edges 48 and 46, processor 18 only searches image portion 180 between edges 48 and 46 to identify side edges and hence to determine if more than one part is located within the part space between edges 48 and 46. Where more than one part is located in part space 180, processor 18 identifies separate 2D part spaces 101 and 103 within space 180.

At block 204, processor 18 associates the decoded code with one of the part spaces identified at block 202 after which control passes back to block 121 in FIG. 6.

Figure 10:
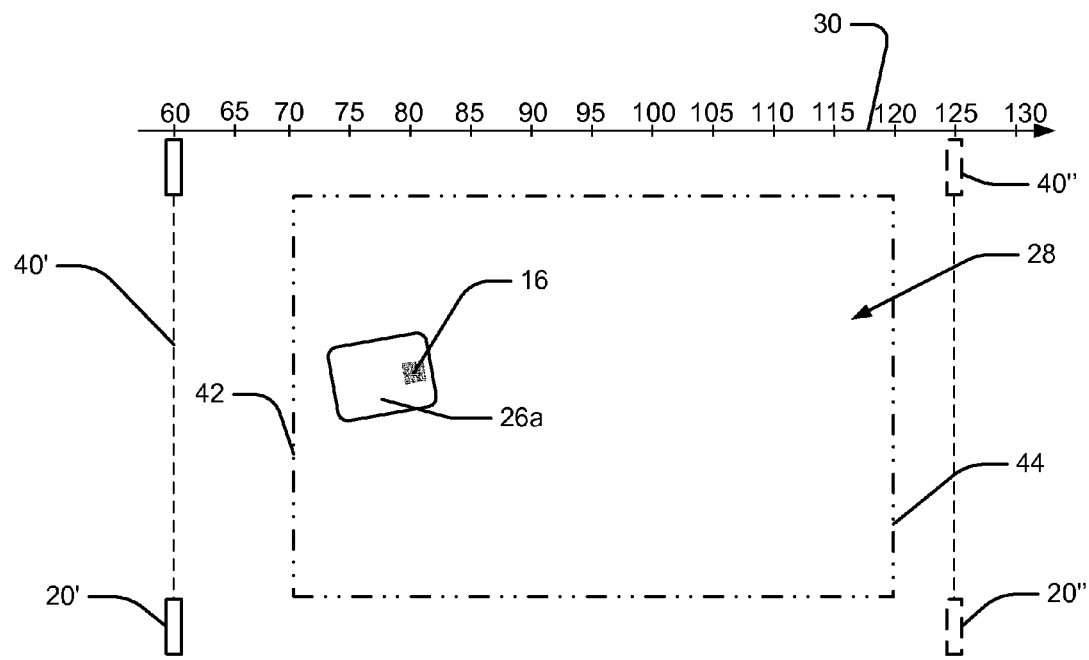
FIG. 10 is a schematic similar to the schematic shown in FIG. 2, albeit showing part presence sensors at different relative locations with respect to a field of view.

In addition to the embodiments described above, other embodiments are contemplated where presence sensor 20 is located at a position other than along the field of view entry edge Len. Here, the location of the sensor 20 on the conveyor scale 30 must be known or determined so that location tracking can be indexed to conveyor assembly 12. For instance, see FIG. 10 where sensor 20' is located at location 60 while the field of view entry edge Len is at 70. In this case processor 18 would be programmed to start tracking part locations at location 60 and may be programmed to start obtaining and analyzing field of view images only after a leading edge of a part reaches location 70 (e.g., 50 encoder counts after the leading edge is first sensed at location 60 assuming the encoder incremental distance Dei is 0.20 units/count).

As another instance, referring again to FIG. 10, a sensor 20" may be located after field of view 28 at location 125. In this case processor 18 would have to continually obtain images and would be programmed in at least some embodiments, to decode a code first and thereafter to identify leading and trailing part edge locations for association with the code. In this regard, after a code is decoded in an image its location Lc on the conveyor is identified and the encoder count PCimage for the image including the decoded code is stored, the increasing encoder count can be used along with PCimage, the encoder incremental distance Dei and prior location Lc to continually calculate the instantaneous or current code location Lcc by solving the following equation:

$$Lcc = Lc + (PC - PC\text{image})(Dei) \qquad \text{Eq. 3}$$

When the part 26a reaches the location at which sensor 20" is aligned processor 18 solves Equation 3 to determine if Lcc is between the leading and trailing edges of a part and associates the code with the part if location Lcc is between the edges.

In still other embodiments where a presence sensor is located after field of view 28, processor 18 may be programmed to calculate prior leading and trailing edge locations for a part for comparison to the location of a code when the code was decoded only after the leading and trailing edges are sensed at the sensor location. For instance, referring again to FIG. 10, where the image pulse count PCimage (i.e., the encoder count when an image including a decoded code was obtained) is known, the leading edge and trailing edge pulse counts PCle and PCte when the edges are sensed at sensor 20" can be used along with the encoder incremental distance Dei to calculate the prior locations Lple and Lpte of the leading and trailing edges at the time corresponding to PCimage by solving the following equations.

$$Lple = Ls - (PCle - PC\text{image})(Dei) \qquad \text{Eq. 4}$$

$$Lpte = Ls - (PCte - PC\text{image})(Dei) \qquad \text{Eq. 5}$$

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims.

What is claimed is:

1. An apparatus for associating codes on parts with part spaces on a conveyor wherein each part has a leading edge and a trailing edge that define a part space and each part is to be marked with at least one code, the apparatus comprising:
an area scan camera having a two dimensional field of view (FOV), the area scan camera supported adjacent the conveyor so that parts conveyed by the conveyor pass through the FOV;
a processor linked to the area scan camera, the processor programmed to perform the steps of:
(i) receiving images from the area scan camera;
(ii) identifying the locations of codes on parts in at least one of the images wherein a code located is a located code;
(iii) identifying the locations of leading and trailing edges of parts wherein the leading and trailing edges define part spaces; and
(iv) associating each located code with a part space that includes the location of the located code.

2. The apparatus of claim 1 wherein the step of identifying locations of codes includes identifying the locations of codes at a first time and wherein the step of identifying the locations of the leading and trailing edges includes identifying the locations of the leading and trailing edges at the first time.

3. The apparatus of claim 2 further including an encoder associated with the conveyor for generating an encoder pulse count each time the conveyor moves an incremental encoder distance, the step of identifying the locations of the leading and trailing edges including the step of using the encoder pulse count to identify the locations of the leading and trailing edges of parts at the first time.

4. The apparatus of claim 3 wherein the processor is further programmed to identify leading and trailing edge pulse counts for each part on the conveyor when the leading and trailing edges of the part are at a sensor location on the conveyor, respectively, and wherein the step of identifying the locations of leading and trailing edges of parts include the step of using the encoder pulse count, the encoder incremental distance, and the leading and trailing edge pulse counts to calculate the locations of the leading and trailing edge pulse counts at the first time.

5. The apparatus of claim 4 further including a part presence sensor supported adjacent the conveyor at the sensor location for sensing presence of the leading and trailing edges of the parts and providing edge detection signals to the processor.

6. The apparatus of claim 5 wherein the conveyor moves parts into the FOV along a conveyor trajectory and wherein the sensor location occurs prior to the location at which the code location is identified along the conveyor trajectory.

7. The apparatus of claim 5 wherein the conveyor moves parts into the FOV along a conveyor trajectory so that parts enter the FOV along an entry edge and leave the FOV along an exit edge and wherein the part presence sensor is located proximate the entry edge.

8. The apparatus of claim 4 wherein the step of identifying the location of the leading edge at the first time includes the steps of calculating a leading edge difference count between the encoder pulse count at the first time and the leading edge pulse count, using the leading edge difference count and the encoder incremental distance to calculate a leading edge position change and combining the leading edge position change and the first location to identify the position of the leading edge at the first time and wherein the step of identifying the location of the trailing edge includes the steps of calculating a trailing edge difference count between the encoder pulse count at the first time and the trailing edge pulse count, using the trailing edge difference count and the encoder incremental distance to calculate a trailing edge position change and combining the trailing edge position change and the first location to identify the position of the trailing edge at the first time.

9. The apparatus of claim 2 wherein the step of identifying the locations of leading and trailing edges of parts within the FOV at the first time includes identifying first and second lateral edges of the parts in the FOV to further define part spaces.

10. The apparatus of claim 1 wherein the step of identifying the locations of codes in at least one of the images at a first time includes obtaining a plurality of images, attempting to decode codes in at least a subset of the obtained images and, when a code is successfully decoded, identifying the location of the successfully decoded code.

11. The apparatus of claim 1 wherein the processor identifies the leading and trailing edges of first and second parts prior to identifying the location of a code and wherein, after the processor identifies the location of a code, the processor associates the code with one of the first and second parts based on the code location and the part spaces associated with the first and second parts.

12. The apparatus of claim 1 wherein the processor performs the step of identifying the locations of leading and trailing edges of parts by identifying the leading and trailing edges in the obtained images.

13. The apparatus of claim 1 wherein the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the location of the code at the first time to calculate the location of the of the code at the second time and associating when the location of the code at the second time is within the part space defined by the locations of the leading and trailing edges at the second time.

14. The apparatus of claim 13 wherein the first time is after the second time.

15. The apparatus of claim 13 wherein the second time is after the first time.

16. The apparatus of claim 1 wherein the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the locations of the leading and trailing edges at the second time to calculate the locations of the leading and trailing edges at the first time and associating when the location of the code at the first time is within the part space defined by the locations of the leading and trailing edges at the first time.

17. An apparatus for associating codes on parts with part locations on a conveyor wherein each part has a leading edge and a trailing edge and each part is to be marked with at least one code, the apparatus comprising:
an encoder associated with the conveyor for generating an encoder pulse count wherein the conveyor moves a known encoder incremental distance along a conveyor trajectory each pulse count;
a part presence sensor for detecting leading and trailing edges of parts at a first location on the conveyor;

an area scan camera having a two dimensional field of view (FOV), the area scan camera supported adjacent the conveyor so that parts conveyed by the conveyor pass through the FOV;

a processor linked to the encoder, the sensor and the area scan camera, the processor programmed to perform the steps of:

(i) for each part that passes through the FOV, identifying a leading edge pulse count when the leading edge of the part is sensed by the presence sensor at the first location and identifying a trailing edge pulse count when the trailing edge of the part is sensed by the presence sensor at the first location;

(ii) receiving images from the area scan camera;

(iii) identifying the location of at least one code on a part in at least one of the images at a first time wherein the code located is a located code;

(v) for each of at least a subset of the parts in the FOV at the first time, using the leading edge pulse count and the trailing edge pulse count as well as the encoder pulse count and the known encoder incremental distance to identify a part space defined by the leading and trailing edges of the part at the first time; and (vi) associating the located code with a part space including the location of the located code at the first time.

18. A method for associating codes on parts with part locations on a conveyor wherein each part has a leading edge and a trailing edge and each part is to be marked with at least one code, the method comprising the steps of:

providing a processor programmed to perform the steps of:

(i) obtaining two dimensional images of a FOV that each includes a two dimensional space through which the conveyor moves parts along a conveyor trajectory;

(ii) identifying the locations of codes on parts in at least one of the images wherein a code located is a located code;

(iii) identifying the locations of leading and trailing edges of parts wherein the leading and trailing edges define part spaces; and (iv) associating each located code with a part space that includes the location of the located code.

19. The method of claim 18 also for use with an encoder associated with the conveyor for generating an encoder pulse count each time the conveyor moves an encoder incremental distance, the processor programmed to perform the step of identifying the locations of the leading and trailing edges by using the encoder pulse count to identify the locations of the leading and trailing edges of parts at the first time.

20. The method of claim 19 wherein the processor is further programmed to identify leading and trailing edge pulse counts for each part on the conveyor when the leading and trailing edges of the part are at a sensor location on the conveyor, respectively, and wherein the step of identifying the locations of leading and trailing edges of parts include the step of using the encoder pulse count, the encoder incremental distance, and the leading and trailing edge pulse counts to calculate the locations of the leading and trailing edge pulse counts at the first time.

21. The method of claim 20 wherein the processor is programmed to perform the step of identifying the location of the leading edge at the first time by calculating a leading edge difference count between the encoder pulse count at the first time and the leading edge pulse count, using the leading edge difference count and the encoder incremental distance to calculate a leading edge position change and combining the leading edge position change and the first location to identify the position of the leading edge at the first time and to perform the step of identifying the location of the trailing edge by calculating a trailing edge difference count between the encoder pulse count at the first time and the trailing edge pulse count, using the trailing edge difference count and the encoder incremental distance to calculate a trailing edge position change and combining the trailing edge position change and the first location to identify the position of the trailing edge at the first time.

22. The method of claim 18 the processor is further programmed to perform the step identifying the locations of codes in at least one of the images at a first time by obtaining a plurality of images, attempting to decode codes in at least a subset of the obtained images and, when a code is successfully decoded, identifying the location of the successfully decoded code.

23. The method of claim 18 wherein the processor identifies the leading and trailing edges of first and second parts prior to identifying the location of a code and wherein, after the processor identifies the location of a code, the processor associates the code with one of the first and second parts based on the code location and the part spaces associated with the first and second parts.

24. The method of claim 18 wherein the processor performs the step of identifying the locations of leading and trailing edges of parts by identifying the leading and trailing edges in the obtained images.

25. The method of claim 18 wherein the step of identifying the locations of leading and trailing edges of parts within the FOV at the first time includes identifying first and second lateral edges of the parts in the FOV to further define part spaces.

26. The method of claim 18 wherein the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the location of the code at the first time to calculate the location of the of the code at the second time and associating when the location of the code at the second time is within the part space defined by the locations of the leading and trailing edges at the second time.

27. The method of claim 26 wherein the first time is after the second time.

28. The method of claim 26 wherein the second time is after the first time.

29. The method of claim 1 wherein the step of identifying the locations of codes on parts includes identifying each code in an image obtained at a first time, the step of identifying the leading and trailing edges of parts includes sensing the leading and trailing edges of each part at a second time different than the first time, and wherein the step of associating each located code with a part space includes using the locations of the leading and trailing edges at the second time to calculate the locations of the leading and trailing edges at the first time and associating when the location of the code at the first time is within the part space defined by the locations of the leading and trailing edges at the first time.

* * * * *